Nov. 3, 1936.   L. I. ANDERSON   2,059,429
CABLE RACK
Filed Oct. 19, 1933
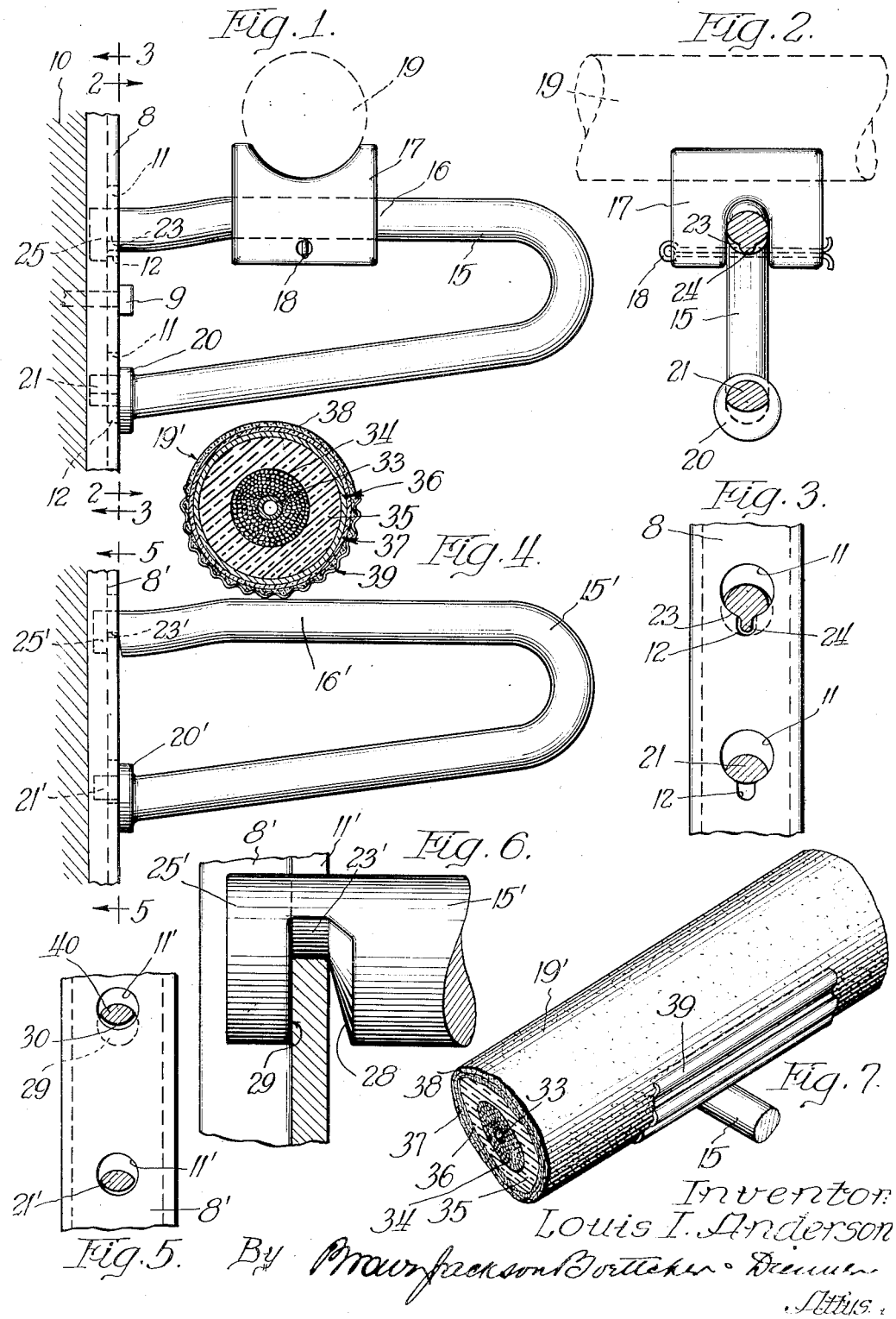
Inventor:
Louis I. Anderson Patented Nov. 3, 1936

2,059,429

UNITED STATES PATENT OFFICE 2,059,429

CABLE RACK

Louis I. Anderson, Chicago, Ill.

Application October 19, 1933, Serial No. 694,236

1 Claim. (Cl. 248—73)

This invention relates to cable racks, and more particularly to cable racks for supporting one or more cables or the like, the rack being attachable to walls or other similar supporting structures.

In employing racks of this type, it is customary to provide anchoring means secured in any suitable manner to the supporting structure, a common example being channel irons which are bolted or otherwise affixed to a wall or other vertical surface, which channels are provided with vertically spaced openings adapted to receive the extending bracket portions of the cable racks. In the prior art of which I am aware, interlocking slots and the like are provided, whereby the rack is inserted into the channel and then rotated or swung to locked position, but these have the disadvantage that manipulation of the rack in this manner is sometimes difficult because of cramped quarters. Further, I have found that racks or brackets of this type are not locked against lateral swinging, and may become misaligned with respect to the cables which they support. Removal of such brackets is also made difficult because of the interlocking feature, and insertion of new brackets or replacements under existing cable lines is therefore not easily accomplished.

In the preferred embodiment of the present invention, I provide a cable rack which may be applied to existing anchoring means already attached to a supporting structure, or which may be used with anchoring means provided as a part of the rack. The bracket portion of the rack of the present invention is not interlocked with the anchoring means, but merely drops into clamped engagement therewith when inserted in its normal operative position with respect to the cable. This facilitates installation of the bracket portion of the rack into position in cramped quarters and in other situations where the cables may be already in position, which installation would not be possible in racks of the prior type.

It is an object of the present invention to provide a cable rack which is readily attachable to and detachable from a supporting structure, which rack may be secured in position without requiring rotation or manipulation of the bracket portion thereof, thus facilitating its use in constricted areas and in replacement of an existing cable rack structure under cable lines.

Another object of the present invention is to provide a cable rack which is adapted for use with an existing type of anchoring means, and which is effectively restrained from any lateral movement after being positioned in the anchoring means.

A still further object of the invention is to provide a cable rack which can be disengaged from the anchoring means merely by raising the bracket portion thereof upwardly, thus facilitating its removal and replacement under existing cable line installations.

The cable rack of the present invention is simple in form, requiring no expensive machining or forming operations, is positive in operation, and is universally applicable in practically all situations requiring this type of supporting structure.

Other objects and advantages of the present invention will appear more fully from the following detailed description, which, taken in connection with the accompanying drawing, will disclose to those skilled in the art the particular construction and operation of a preferred form of the invention.

In the drawing:

Figure 1 is a side view of one form of the cable rack installed in operative position;

Figure 2 is a view taken substantially on the line 2—2 of Figure 1, looking in the direction indicated by the arrows, and showing the clamped engagement of the bracket portion within the anchoring means;

Figure 3 is a view taken substantially on the line 3—3 of Figure 1;

Figure 4 is a side elevational view of a modified form of cable rack mounted in position, and having a modified type of supporting means for the cable;

Figure 5 is a detailed view, taken along the line 5—5 of Figure 4, showing the engagement of the extremities of the bracket portion of the rack in the anchoring means;

Figure 6 is an enlarged detailed view of the manner in which the bracket is engaged in the anchoring means; and Figure 7 is a perspective detailed view showing a cable shield for engagement with the surface of the bracket upon which the cable is supported.

Referring now in more detail to the drawing, the cable rack of Figure 1 comprises a channel-shaped anchoring member indicated by the reference numeral 8, which is provided with anchoring means, such as the anchor bolt 9, for securing it to a supporting wall, or a similar structure indicated at 10. The anchoring member 8, as shown clearly in Figures 3 and 5, comprises a channel-shaped structural member, having a plurality of openings 11 formed therein, the openings 11 of the embodiment shown in Figures 1 and 3 being provided with cut-out portions 12, corresponding to one type of anchor member now in use.

The bracket portion of the cable rack comprises a substantially V-shaped member 15, formed of solid stock, although, if desired, this may be formed of piping or the like, which is provided with a substantially horizontal portion 16 adapted to support one or more saddle members 17, which saddle members are provided with clip members 18 for securing them to the bracket 15. These saddle members are preferably formed of porcelain or a similar insulating material.

The saddle members 17 are laterally movable with respect to the bracket, to accommodate expansion and contraction of the cable member indicated diagrammatically at 19. If this movement is not provided, the stresses occasioned by changes in temperature adjacent or in the cable will result in a large stress being imposed upon the cable whenever its motion is restricted. Cyclic changes in temperature due to changes in load tend to cause expansion and contraction and these result in motion. If the cable itself runs on a stationary support it will wear a hole through the sheath. By providing the laterally movable saddle members 17, these stresses are distributed over the length of the cable, and thus no injurious stress occurs at any one point. Also, when cables are led around corners or the like in manholes and similar locations, it is desirable that some such movement be provided for the ordinary shifting of the cable.

The lower arm of the bracket 15 is provided, at its extremity, with an annular flange indicated at 20, this annular flange being formed by any desired upsetting operation. Projecting from the flange 20 is an integral tongue or tip portion 21, which is of reduced section as compared to the section of the bracket 15, for a purpose to be hereinafter described.

The upper arm is provided, adjacent its extremity, with a notched throat portion, shown in detail in Figure 2, which throat portion is indicated by the reference numeral 23, and which has a downwardly extending tongue portion 24 adapted to engage within the keyways or slots 12 formed in the periphery of the vertically spaced openings 11.

In fastening the bracket 15 to the anchoring member 8, all that is necessary is to insert the end portion 25 of the upper arm of the bracket through the upper opening 11 of the anchor member, while the lower portion or projecting tongue 21 enters the upper half of the lower opening 11. When the throat or notch 23 of the upper arm of the bracket member is disposed adjacent the periphery of the opening 11, the bracket member 15 is dropped downwardly, the tongue 24 dropping into the keyway 12, while the notched throat 23 engages about the periphery of the lower portion of the opening 11, and clamps upon opposite faces of the channel member 8. At the same time, the extending tongue 21 of the lower arm of the bracket member assumes the position shown in Figure 3, and the annular flange 20 bears against the outer face of the member 8. In this position, the flange 20 engages a substantial portion of the area of the face of the anchor member 8, and thus provides sufficient area to withstand any compression stresses being transmitted through the lower arm of the bracket.

The clamping engagement of the throat 23 about the periphery of the opening 11, enables the bearing surfaces formed on the rear face of the extending end 25 of the upper arm of the bracket, to engage the surface of the anchoring member 8 about the periphery of the opening 11, which prevents any lateral swinging movement of the bracket 15 with respect to the anchoring member. Correspondingly, the other defining face of the throat engages the outer surface of member 8. Also, the alignment of the tongue 24 in the keyway 12 further prevents any lateral swinging movement, although, as will be hereinafter pointed out, this tongue is not essential to the operation of the structure.

It should be noted that the bracket member 15, when being attached to the anchor member 8, is disposed in a position corresponding to the position which it will assume when it is in cable-supporting position. Thus, there is no need for rotation or manipulation of the bracket member, other than to move it inwardly through the opening 11, and then allow it to drop down into clamping engagement with the anchoring member. This facilitates its installation in situations where freedom of movement is restricted, and also allows for its installation under existing cable lines, where rotation or manipulation of the bracket might be impossible or undesirable.

It will be apparent that the bracket member may be engaged in any desired adjacent openings 11 formed within the extent of the anchor member 8, and thus its position may be adjusted to the position corresponding to that in which it is desired to support the cable. For example, if the cable 19 is to be supported at a lower level, the upper arm 16 of the bracket might be clamped within the opening shown as being occupied by the portion 21 of the lower arm of the bracket, thus spacing the entire bracket member considerably lower than the position shown in Figure 1. Also, additional bracket members may be provided for supporting cables above and below the cable 19, which may be attached to the anchoring means in the same manner.

Referring now to the embodiment of the invention shown in Figures 4 to 7, inclusive, the bracket member 15' of this modification is similar in form to the bracket member 15 of Figures 1 to 3. However, the inner end of the bracket 15' is formed somewhat differently than the inner end of the upper portion of the bracket 15 shown in Figures 1 to 3. In this embodiment, the anchor member 8' is provided with circular openings, as shown in Figure 5, and indicated by the reference numeral 11', which are not provided with keyways or the like. Correspondingly, the inner extremity 25' of the upper arm of the bracket 15' is provided with a tapered throat indicated by the reference numeral 23', which throat is substantially sector-shaped in form, as shown in detail in Figure 6, having the substantially tapered bearing face 28 and preferably having a planar bearing face 29.

The tapered throat 23' is formed in this manner for the purpose of accommodating the bracket portion 16' of the cable rack to channel members 8' which may be of varying degrees of thickness. For example, if the channel member 8' is of a thickness of one-quarter of an inch, the throat 23' will not engage about the defining edge of the opening 11', but will be spaced slightly therefrom, as shown at 30 in Figure 5, the bearing in this case being provided by the opposed faces 28 and 29 defining the throat. The substantially planar face 29 serves to provide a relatively large bearing area which engages the inner surface of the channel, and prevents relative movement between the channel and the bracket, and produces an effective clamping or gripping engagement with the opening.

However, when the thickness of the facing portion of the panel member 8' is of the order of three-sixteenths of an inch, the bracket member will drop downwardly into contact with the defining edge of the opening 11', since the throat at its uppermost limit is cut away to this thickness. This tapered formation of the throat allows the application of the bracket to anchoring means which may be already in position, and which may be of a thickness differing from the thickness of other anchor means provided as a part of the rack. In its other respects, the bracket member 15' is similar to the bracket member shown in Figures 1 to 3, and needs no further description.

Considering now the cable which is supported upon the bracket member in the embodiment of the invention shown in Figures 4 to 7, inclusive, this cable comprises a central core member indicated at 33, which core member is surrounded by a plurality of conductors indicated generally at 34, which are engaged in suitable insulating material 35, having a protective sheath or coating 36 thereabout. On the outer surface of the sheath or coating 36 is provided an asbestos felt or similar wrapping, indicated at 37, over which is applied a layer of cementitious material for the purpose of fireproofing the cable, which layer is indicated at 38. The cable in its entirety is indicated by the reference numeral 19'. It is to be understood that any insulated type of cable, such as a lead covered cable or the like, may be used in place of the illustrated cable shown, without in any way departing from the scope of the invention.

While the fireproofing layer 38 is still unset, a shield member, indicated at 39, is embedded therein, the shield member being a substantially semi-cylindrical shell member transversely corrugated as shown in Figures 4 and 7.

The embedding of the shield member 39 in the fireproof covering 38 of the cable 19' results in providing a shield or bearing member which is engaged upon the upper surface of the bracket 15', and which serves as a bearing for both lateral and longitudinal movement of the cable 19', which movement may be due to temperature changes, warping, or other similar movements of the cable. Thus, the fireproof coating 38 is not in direct contact with the cable brackets and consequently is not worn to an extent whereby its capacity as a protective coating would be destroyed. By corrugating the coating 39 from a piece of thin sheet metal or the like, a material quantity of the metal must be worn away before the shield loses its protective effect as a bearing member between the bracket and the cable covering. Actual tests have shown that the shield member will outlast the life of the cable, and consequently will more than adequately protect the cable covering 38 during the life of the cable. These shield members 39 are spaced along the cable directly above each cable rack or supporting frame, and thus the cable is allowed to move freely upon the bracket portion of the rack, and the friction of such movement is entirely taken up by the shield 39 and the cable bracket, thus eliminating any wear upon the cable or its insulating covering.

The clamping action of the throat 23' about the periphery of the opening 11' prevents any lateral movement of the bracket 15' and maintains the bracket in a rigid position normal to the axial extent of the cable. The bracket is inserted in the same manner as described in connection with the bracket 15 of Figure 1, and the annular flange 20' of the bracket 15' absorbs all the compression stresses occasioned by the weight of the cable upon the bracket. It will therefore be apparent that the only stresses encountered at the upper clamped end of the cable bracket are a tension stress through a section of the material indicated by the reference numeral 40 in Figure 5, corresponding to the cross sectional area of material through the throat of the upper arm, or a shearing stress upon the inner extending portion 25' of the upper arm. However, these stresses are not sufficient to result in failure of the bracket at this point.

Because of the simplicity of design of the cable rack of the present invention, it may be easily attached to and detached from the anchoring means, and is relatively inexpensive to produce. Further, it may be installed in situations where a cable bracket or rack requiring manipulation in order to engage interlocking portions thereof could not be installed because of limited spacial requirements.

I am aware that various modifications and changes in the details of construction of the preferred embodiment of the invention herein disclosed may be made, without, however, departing from the spirit of the invention, and I do not intend to be limited except as defined by the scope of the appended claim.

I claim:

In combination, a supporting member having a pair of corresponding circular openings spaced apart vertically, an arm member serving as a cantilever beam extending from said supporting member and comprising a round bar bent into the form of a V and having parallel extending end portions spaced apart a distance corresponding to the spacing of said openings, the upper arm portion having a wedge-shaped locking groove extending radially inwardly substantially to the center of said arm portion from the lower periphery thereof adjacent its end and provided with a planar radial surface engaging the back side of said supporting member about the lower portion of the upper one of said openings when said arm portion is inserted into said one opening and moved downwardly therein, and an annular compression flange adjacent the end of the lower arm portion and engageable about the outer surface of said supporting member around another of said openings to resist the thrust of the load on the cantilever beam to thereby shackle said arm in said supporting member, the projecting end of said lower arm portion being reduced in vertical extent beyond said flange to accommodate vertical movement of said arm during attachment of the upper portion to said supporting member.

LOUIS I. ANDERSON.